P. MUELLER AND A. C. SCHUERMANN.
ADJUSTABLE ESCUTCHEON.
APPLICATION FILED APR. 9, 1921.
1,436,668.
Patented Nov. 28, 1922.
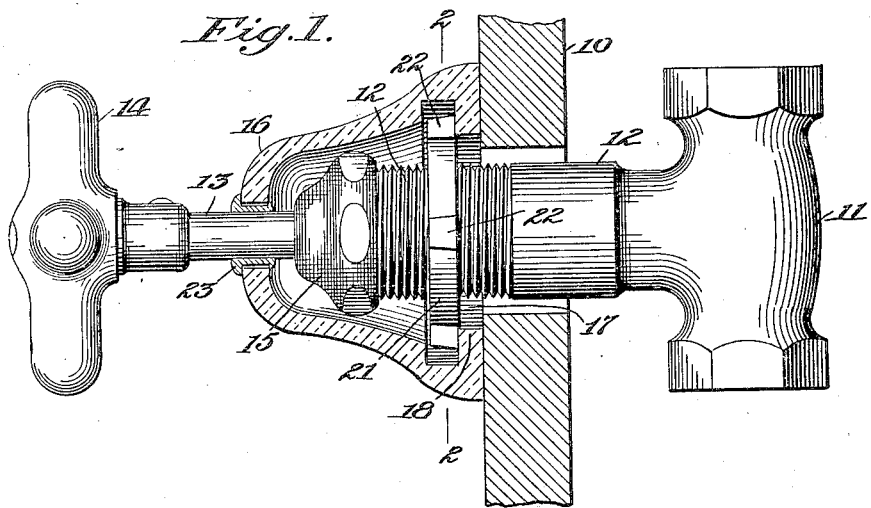
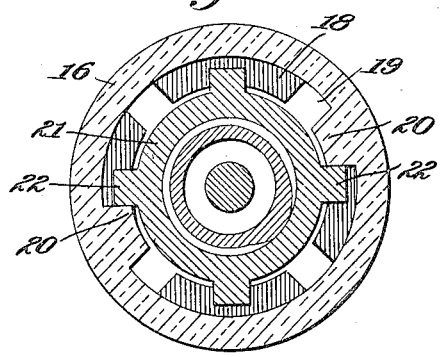
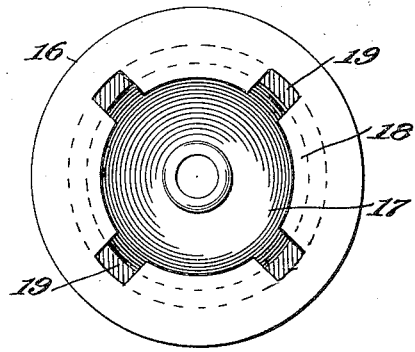
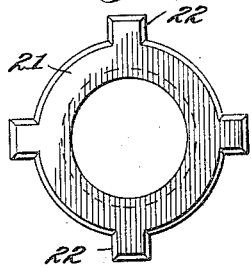
Inventors:
Philip Mueller and
Anton C. Schuerman,
By Cushman, Bryant & Darby
Att'ys Patented Nov. 28, 1922.

1,436,668

UNITED STATES PATENT OFFICE.

PHILIP MUELLER AND ANTON C. SCHUERMANN, OF DECATUR, ILLINOIS.

ADJUSTABLE ESCUTCHEON.

Application filed April 9, 1921. Serial No. 459,937.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Adjustable Escutcheons, of which the following is a specification.

The present invention relates to wall or slab fittings for pipes, as, for example, the shanks of cocks or faucets, and relates more particularly to means for securing an ornamental flange or escutcheon in adjusted position upon a cock or other similar member.

The development is of particular advantage in connection with escutcheons or flanges of vitreous material, which, being comparatively fragile, are likely to become broken if undue strain from fastening nuts, screws and the like is imposed upon them, and which, furthermore, present difficulties in the matter of providing efficient means for securing them snugly in place.

Various means have been provided for accomplishing this fastening of escutcheons, both of metal and vitreous ware, and while these different means have merit, they involve, so far as is known to us, somewhat complicated constructions, and the assembling of the parts is attended with some difficulty.

It is with the object of providing a device which is simple of manufacture and assembly that the present development has been made, and which is shown in the accompanying drawings, in which drawings:—

Fig. 1 is a sectional view of so much of a wall board and fitting as is necessary to a disclosure of our invention.

Fig. 2 is a sectional view substantially on the line 2—2 of Fig. 1.

Fig. 3 is a rear view of the escutcheon which is designed to be secured in place, and Fig. 4 is a detail plan view of the locking nut which cooperates with the escutcheon.

Referring to the drawings by numbers, like numbers indicating like parts in the several views, 10 indicates a wall board, slab or abutment, it being here shown as arranged in vertical position. In the rear of the slab is shown the T-fitting 11, which will, of course, be connected in to the pipe line. 12 indicates the shank of the cock, which may be of any suitable construction, and in which will be mounted the valve (not shown) to which will be secured the valve stem 13 having any suitable handle 14, a cap nut 15 to engage the threaded end of the shank being provided.

It is desirable in all fittings of this kind that the shank of the faucet and the apertures in the wall or slab be covered and closed, and this is very usually accomplished by a suitable escutcheon. At the present time escutcheons of vitreous material or finish are in favor, and with the use of such escutcheons, since vitreous ware cannot be conveniently or successfully threaded to the parts, independent fastening means must be provided.

In the present showing, an escutcheon 16 of sufficient size to enclose the parts and of any appropriate design is provided, the escutcheon having a base to rest flat upon the wall or slab 10 and being interiorly chambered to receive the parts of the faucet which are to be covered. The escutcheon 16 is provided at a point near its base with an annular recess 17, this recess having at one side, namely the side nearest the base, the inwardly depending interrupted rib 18, the interruptions between the rib sections being in the form of radially disposed apertures 19, four being shown in the present instance.

This construction is designed for the purpose of receiving the escutcheon locking nut or washer, which, as shown, is threaded upon the shank 12 of the faucet, this shank being threaded through a considerable portion of its length to give a proper length of travel to the nut to insure its clamping action, which will now be described. The recess 17 has at one or more points in its periphery lugs 20 to make rotative engagement with the nut 21, which nut is preferably, as shown herein, provided with one or more radially projecting lugs 22, the dimensions of which are such that they will readily pass the radially disposed apertures 19 in the rib 18 of the escutcheon 16.

With this construction it will be seen that when the parts are in the position shown in Fig. 1 the escutcheon 16 may be rotated freely, there being provided, preferably, a thimble 23 at the stem aperture in the end of the escutcheon to give it bearing for the stem 13. The continued rotation of the escutcheon will cause the lugs 20 in the groove 17 of the escutcheon to engage the lugs 22 on the nut 21 so that the nut will be rotated on the threaded section of the shank 12 and fed rearwardly or in the direction of the rib 18 of the escutcheon 16. Continued rotation will, of course, set the nut 21 up against the rib-sections 18 with a clamping action and clamp the escutcheon firmly and evenly in place, the clamping strain being distributed equally by the four lugs 22 so that danger of fracturing the vitreous ware by uneven pressure upon the ribs 18 is practically eliminated. Removal of the escutcheon will, of course, be accomplished by rotating the escutcheon and nut in a reverse direction.

It will be seen that the escutcheon will be entirely closed about its base, there being no necessity for the formation of tool openings to permit access to fastening means, and that a perfectly tight covering escutcheon is provided, and one which, by the simple rotation of the escutcheon, may be placed or removed.

In assembling or disassembling the parts it is necessary, after the fitting 11 and the faucet 12 have been placed with respect to the wall board or slab, to simply run the nut 21 on to the threaded portion of the shank, place the stem 13 with its valve and the cap nut 15 in place, after which the escutcheon 16 will be slipped over the stem, its apertures 19 moved past the lugs 22 and the handle 14 will be secured to the stem and the escutcheon may then be set up against the wall by rotating it, and with it the nut, in the manner heretofore described.

No claim is made in this application to the escutcheon per se as such escutcheon is the subject of co-pending application, serial No. 454,401, filed March 22, 1921, this escutcheon together with other and different attaching means being disclosed also in patent No. 1,377,597, granted Mar. 10, 1921, these being the sole aplications of Philip Mueller, joint inventor of the present development.

It is obvious that changes in the construction and design of the parts may be made without departing from our invention, for with different styles and shapes of fitings various forms and other mechanical expedients may be adopted.

We claim:

1. In a fitting of the class described, the combination of a support, an escutcheon clamp shiftable lengthwise of said support, an escutcheon rotatable with respect to said support, interengaging means between said escutcheon and said clamp to shift the clamp along said support when said escutcheon is rotated, and interengaging means between said escutcheon and said clamp to force said escutcheon against a suitable abutment when said clamp is shifted.

2. In a fitting of the class described, the combination of a threaded support, an escutcheon clamp screw-threaded to said support, a rotatable escutcheon encircling said support, interengaging means between said escutcheon and said clamp to rotate and shift said clamp along said support when said escutcheon is rotated, and interengaging means between said escutcheon and clamp to force said escutcheon against a suitable abutment when said clamp is shifted.

3. In a fitting of the class described, the combination of a threaded faucet shank, an escutcheon clamp screw-threaded to said shank, a hollow rotatable escutcheon housing said shank and clamp, interengaging means between said escutcheon and clamp to shift said clamp along said support when said escutcheon is rotated, and interengaging means between said escutcheon and clamp to force said escutcheon against a fixed abutment when said clamp is shifted.

4. In a fitting of the class described, the combination of a threaded faucet shank, an escutcheon clamp threaded thereon, a hollow rotatable escutcheon housing said shank and clamp, means on said escutcheon to rotate and shift said clamp along said shank when said escutcheon is rotated, and means on said clamp to engage said escutcheon and force it against a fixed abutment when said clamp is shifted.

5. In a fitting of the class described, the combination of a threaded faucet shank, an escutcheon clamp threaded thereon, a hollow rotatable escutcheon housing said shank and clamp, a lug on said escutcheon to rotate and shift said clamp along said shank when said escutcheon is rotated, and a lug on said clamp to force said escutcheon against a fixed abutment when said clamp is shifted.

6. In a fitting of the class described, the combination of a threaded faucet shank, an escutcheon clamp threaded thereon, a hollow rotatable escutcheon housing said shank and clamp, radially disposed lugs on said escutcheon to rotate and shift said clamp along said shank when said escutcheon is rotated, and radially disposed lugs on said clamp to force said escutcheon against a fixed abutment when said clamp is shifted.

7. In a fitting of the class described, the combination of a threaded faucet shank, an escutcheon clamp threaded thereon, a hollow rotatable escutcheon housing said shank and clamp, lugs extending inwardly from the interior wall of said escutcheon to rotate and shift said clamp along said shank when said escutcheon is rotated, and outwardly extending lugs on said clamp to force said escutcheon against a fixed abutment when said clamp is shifted.

8. In a fitting of the class described, the combination of a threaded shank, a clamp having radial escutcheon-engaging lugs on said shank, a hollow rotatable escutcheon housing said shank and clamp, clamp-rotating lugs on the interior of said escutcheon, and a rib on said escutcheon for engagement by said clamp lugs.

9. In a fitting of the class described, the combination of a threaded shank, a clamp having radial escutcheon-engaging lugs on said shank, a hollow rotatable escutcheon housing said shank and clamp, clamp-rotating lugs on the interior of said escutcheon, and alternating rib section and apertures on said escutcheon said apertures adapted to receive said clamp lugs.

10. In a fitting of the class described, the combination of a threaded shank, a clamp having radial escutcheon-engaging lugs on said shank, a hollow rotatable escutcheon housing said shank and clamp, clamp-rotating lugs on the interior of said escutcheon, and alternating rib sections and apertures arranged circumferentially and interiorly of said escutcheon at the base thereof said apertures adapted to receive said clamp lugs.

In testimony whereof we have hereunto set our hands.

PHILIP MUELLER.
ANTON C. SCHUERMANN.